United States Patent [19]

Ishibashi et al.

[11] 4,352,001
[45] Sep. 28, 1982

[54] METHOD AND APPARATUS FOR PRODUCING WELDED METALLIC CAN BODY

[75] Inventors: Kazuhisa Ishibashi, Tokyo; Sadaki Matsui, Machida; Hisakazu Yasumuro, Yokohama; Tsuneo Imatani; Hiroshi Ueno, both of Yokosuka; Seishichi Kobayashi, Yokohama, all of Japan

[73] Assignee: Toyo Seikan Kaisha Limited, Tokyo, Japan

[21] Appl. No.: 190,846

[22] Filed: Sep. 25, 1980

[30] Foreign Application Priority Data

Sep. 26, 1979 [JP] Japan ................................ 54-122546

[51] Int. Cl.³ .............................................. B23K 1/16
[52] U.S. Cl. ..................................... 219/64; 219/61.7; 219/66
[58] Field of Search ........................... 219/64, 66, 61.7

[56] References Cited

U.S. PATENT DOCUMENTS 3,495,065 2/1970 Tappolet ................................ 219/64

FOREIGN PATENT DOCUMENTS 1021687 12/1957 Fed. Rep. of Germany ........ 219/64

*Primary Examiner*—Elliot A. Goldberg
*Attorney, Agent, or Firm*—Wenderoth, Lind & Ponack

[57] ABSTRACT

An improvement in a method for producing a welded metallic can body. The method involves holding and pressing a lap portion of the side marginal portions of a can body-like structure, which has been formed by bending a metal blank into a cylindrical shape, along its entire length between a pair of opposing parallel wire electrodes placed on the opposing surfaces of parallel electrodes, and passing an electric current across the parallel electrodes for a predetermined period of time during the pressing to subject the lap portion to resistance welding. At least one of the parallel electrodes is divided longitudinally into two or more portions electrically insulated from each other, and an electric current is passed through at least one of them independently from the other portions so that the temperature rise in the lap portion of the can body-like structure becomes uniform. Also disclosed is an apparatus for producing a welded metallic can body in accordance with the aforesaid method.

19 Claims, 4 Drawing Figures

METHOD AND APPARATUS FOR PRODUCING WELDED METALLIC CAN BODY

This invention relates to a method and an apparatus for producing a welded metallic can body. More specifically, this invention relates to a method and an apparatus for continuously producing a welded metallic can body at high speed by subjecting the entire overlapped, hereinafter simply lapped, portion of a can body-like structure simultaneously to electric resistance welding through wire electrodes.

In the present application, the term "impulse-line welded seam can", denotes a can obtained by the simultaneous electric resistance welding of the entire length of a lapped side seam portion of a metallic can body.

A previously known method for producing a so-called welded metallic can body comprises slightly lapping the opposing marginal portions of a square metal blank cut out from a metallic plate and bent into the shape of a can body, and subjecting the lapped portion of the can body-like structure to electric resistance welding. There are roughly two methods of welding a seam portion in the conventional production of a welded metallic can body, namely a roller electrode method and a parallel electrode method.

The roller electrode method comprises directly contacting fixed rotating roller electrodes such as disclosed in U.S. Pat. No. 3,761,671 with both surfaces of the lapped portion and seam-welding it under pressure. In the case of high-speed continuous production, the surfaces of the rotating roller electrodes are heavily soiled and worn. Hence, the electrode must usually be replaced by stopping the operation every several hours. This entails problems such as the reduction of productivity, securing of the maintenance personnel, and the non-stability of the quality of the welded part. As a means for solving this problems, there has been proposed a method which comprises inserting a wire electrode running synchronously with a weld material between the rotating roller electrodes as described in U.S. Pat. No. 2,938,651 and the lapped portion of the material to be welded, and seam-welding the lapping portion under pressure. In this method, the life of the rotating roller electrodes is long. But since the wire electrode is exposed to air at the red hot portion and is difficult to cool sufficiently, it undergoes soiling and wear and can normally be used only once. Accordingly, the wire electrode requires a length corresponding to the length of a can body being welded.

Furthermore, the welded parts of metal can bodies obtained by the aforesaid rotating roller electrode method generally have the following common defects.

(1) Occurrence of a convex lens-like nugget

In the roller electrode welding method, the welding temperature changes periodically in the lengthwise direction of a can body seam, and two parts which are heated to a maximum temperature and two parts which are heated to a minimum temperature are formed for each cycle of the electric power source. As a result, the structure of the metal changes at the parts which have undergone the high heat of welding, and this change extends in the form of a convex lens in the metal about the sites which have been heated to the maximum temperature. The changed areas of the metal structure are called "nuggets". When it is desired to weld a portion between nuggets completely, the temperature of the nugget portions becomes unusually high, resulting in the growth of a thick oxide coating. As a result, this tends to cause corrosion or leakage when material is filled in the resulting can.

(2) Occurrence of splash

This denotes the phenomenon wherein because of an excessive rise in temperature at the nugget portions, the molten metal flies out from the space in the lapped portion and sticks to the marginal portions of the lapped portion. When this phenomenon occurs on the inside surface of the can, the splash cannot be completely covered by a protective coating, and this tends to cause corrosion, pitting, and reduced flavor of can contents owing to the dissolution of the metal therein.

(3) Protrusion of metal

Small triangular protrusions projecting in the direction of the height of the can from the welded part at the can end portion, and protrusions extending in the circumferential direction of the can are formed probably because the seam welding corresponds to a kind of hot rolling. The former protrusions tend to break a sealing rubber in double seaming, and impair the sealing property of the can. The latter protrusions cause exposure of iron when a tin-plated steel plate is used as a can body-making blank. In both of these cases, corrosion, leakage of contents, the reduction of the degree of vacuum tend to be caused.

(4) Occurrence of a black oxide film

That part of the lapped portion which is immediately below the roller electrode and its surrounding part assumes a red hot state. Since the surrounding part is exposed to air, an oxide film forms on that part. To prevent it, a special operation such as blowing of an expensive inert gas is required. This oxide film is porous and cannot perform a corrosion-resisting function. Thus, a protective paint must be coated thereon after the welding operation. Since the oxide film is brittle and has poor adhesion to the substrate iron, it is liable to separate from the substrate iron together with the protective coating when the can body is bent at a double seamed portion. Accordingly, cans of this type are unsuitable for applications which require corrosion resistance. Furthermore, when the metal blank is a tin-plated steel plate, tin undergoes oxidation or diffuses into the substrate iron as the black oxide film grows. Consequently, the substrate iron gets exposed, and this in turn accelerates corrosion by the can contents is likely to induce leakage. Furthermore, since the vicinity of the weld zone is also heated, re-flow of tin occurs at this part to increase the amount of an iron-tin alloy which tends to cause corrosion or sulfidation blackening.

(5) Heat deformation

That part of the lapped portion which is immediately below the roller electrode and its surrounding part thermally expands because of the high temperature and is welded in the expanded state. Consequently, after the welding, heat deformation remains in the vicinity of the welded part. This impairs the appearance of the final welded product.

As a method for producing a metallic can body using parallel electrodes, U.S. Pat. No. 3,069,530 discloses a method which comprises inserting a lapped portion of a can body-like structure between a first electrode fixed to the lower end of a mandrel supporting the can body-like structure and extending in the direction of the lapped portion and a second electrode fixed to the upper end portion of a presser parallel and opposed to the first electrode, and subjecting the lapped portion to resistance welding under pressure. According to the method suggested by this U.S. Patent, at least one of the marginal portions of the metal blank constituting the lapped portion is embossed to provide a number of small projections, and welding is started by melting the tips of these small projections. Accordingly, this method has the defect that splashes tend to form in the welded part. Furthermore, since the fixed electrodes make direct contact with the lapped portion, they are liable to undergo soiling and wearing, and in the continuous high-speed production of cans, it is frequently necessary to exchange the electrodes. This is a serious defect from the viewpoint of productivity.

U.S. Pat. No. 2,854,561 discloses a method which comprises providing a first electrode extending parallel to the inside surface of a lapped portion of a can body-like structure and a second thin plate-like electrode contacting the outer surface of the lapped portion and being movable perpendicularly to the lapped portion, connecting these first and second electrodes to a welding power source, pressing the lap portion by a presser provided above the second plate-like electrode, and welding the entire lapped portion simultaneously. Although this method has the advantage that frequent exchange of electrodes is not necessary, it has the following problems. Since the electrodes are not forcedly cooled, a large current used at the time of welding increases the temperature of the electrodes, and heat deformation is liable to occur owing to the oxidation or thermal expansion of the welded part and the surfaces of the electrodes. The second thin plate-like electrode is particularly prone to undergo heat deformation, and this makes it impossible to apply uniform pressure to the lap portion. Consequently, localized melting tends to occur and may cause splashes. Moreover, in the case of high-speed continuous production, the length of the second plate-like electrode in the transverse direction must be made long, and the production equipment increases in size.

Previously, the present inventors attempted to provide a welding method that can overcome the problems of the prior art techniques, and can provide a welded part which is beautiful and sound, has superior corrosion resistance, can withstand subsequent processing and is free from heat deformation and formation of a black oxide film, and they developed a method which comprises placing a wire electrode on each of the opposing surfaces of a pair of parallel electrodes to form a pair of opposing wire electrodes, pressing a lapped portion of a can body-like structure by the parallel electrodes through the wire electrodes, and passing an electric current across the electrodes thereby welding the entire lapped portion at the same time. They applied for a patent (Japanese Patent Application No. 102952/78). However, by the method of line welding by supplying an impulse current via the wire electrodes placed on the opposing surfaces of the parallel electrodes (to be referred to hereinbelow as the "wire electrode impulse line welding method"), it is impossible to remove non-uniformity of welding in the longitudinal direction in the welding of a lapped side seam of a can having a large length (i.e., a tall can).

It is an object of this invention therefore to provide an improved wire electrode impulse line welding method and apparatus by which it is possible to weld the entire length of a lapped side seam of a long can body uniformly by a resistance welding method.

Another object of this invention is to provide a method and an apparatus for producing a welded metallic can in which the lapped side seam of the can body is welded in good condition to give a uniformly welded part having superior corrosion resistance and capable of withstanding subsequent processing.

The present inventors made investigations in order to achieve the above objects, and found that one of the main causes of non-uniform welding in the lengthwise direction by the impulse line welding method is that the pressure applied by the parallel electrodes to a lapped portion to be welded is non-uniform, and consequently, the heat of electric resistance generated at the interface between the electrodes and the can body-making material is non-uniform.

The present invention provides a method for producing a welded metallic can body which comprises holding and pressing a lapped portion of the side marginal portions of a can body-like structure along its entire length between a pair of opposing parallel wire electrodes placed on the opposing surfaces of parallel electrodes, said can body-like structure having been formed by bending a metal blank into a cylindrical shape, and passing an electric current across the parallel electrodes for a predetermined period of time during the pressing to subject the lap portion to resistance welding; characterized in that at least one of the parallel electrodes is divided longitudinally into two or more portions which are electrically insulated from each other, and an electric current is passed through at least one of them independently from the other portions so that the temperature rise in the lapped portion of the can body-like structure becomes uniform.

The method of this invention can be practised by using an apparatus according to this invention comprising a pair of opposing parallel electrodes, a pair of opposing parallel wire electrodes placed respectively on the opposing surfaces of said parallel electrodes, press means connected to one of the parallel electrodes for pressing said one electrode toward the other parallel electrode, said press means being adapted to hold and press a lapped portion of the side marginal portions of a can body-like structure formed by bending a metal blank into a cylindrical shape between said pair of wire electrodes along the entire length of said lap portion, and means for passing an electric current across the electrodes thereby to weld the lap portion; characterized in that at least one of the parallel electrodes has two or more longitudinally divided portions which are electrically insulated from each other, and at least one of said divided portions is connected to said electric power source independently of the other portions.

There is no particular restriction on the type of the metal blank used in this invention, and an aluminum plate, for example, may be used. Suitable metal blanks are those usually employed as a blank for metallic cans, for example coated or non-coated low-carbon steel plates with a thickness of about 0.14 to about 0.35 mm, such as tin-plated steel plates, tin-free steel plates, thin nickel-plated steel plates, phosphate-treated steel plates, black plates, and coated products of these plates. In the case of a blank having an electrically insulating coating formed thereon, such as tin-free steel, phosphate-treated steel plate and coated plate, in order to obtain a good welded part, the surface coating is preferably removed at least from both surfaces of that part of the blank which is to become the lapped portion of a can body by a suitable means, for example by using a single-point tool, milling cutter or grinder or by application of ultrasonic waves, to thereby expose the substrate iron.

The metal blank of the above-exemplified material is cut to a predetermined size, and formed into a can body-like shape such as a cylindrical or rectangular shape, usually the cylindrical shape. Then, a lapped portion of the marginal portions of the resulting structure is subjected to resistance welding to form a can body. Welding in its broad definition includes both fusion welding and forge welding. In the case of fusion welding, the weld zone is first melted and then quenched and therefore is liable to include air bubbles which may cause leakage of can contents. Furthermore, since a brittle dendritic structure grows in the welded portion, it tends to be broken at the time of double seaming. Accordingly, the welding in the present invention should desirably be substantially forge welding, that is solid-phase welding.

The resistance welding method in this invention comprises holding and pressing the lapped portion of a can body blank through wire electrodes placed on the opposing surfaces of a pair of parallel electrodes, and passing an electric current across the electrodes to weld the entire lapped portion simultaneously. The method is characterized by the fact that at least one of the aforesaid parallel electrodes is divided into 2 or more portions which are electrically insulated from each other, and electric power is supplied to at least one of these divided portions independently from the other portions as to permit independent adjustment of the heat of electric resistance generated in each of said divided portions, thereby making the thus generated heat of electric resistance uniform along the entire length of the lapped portion to be welded.

The method and apparatus for making a welded metallic can in accordance with this invention are described below with reference to the accompanying drawings in which.

Figure 2:
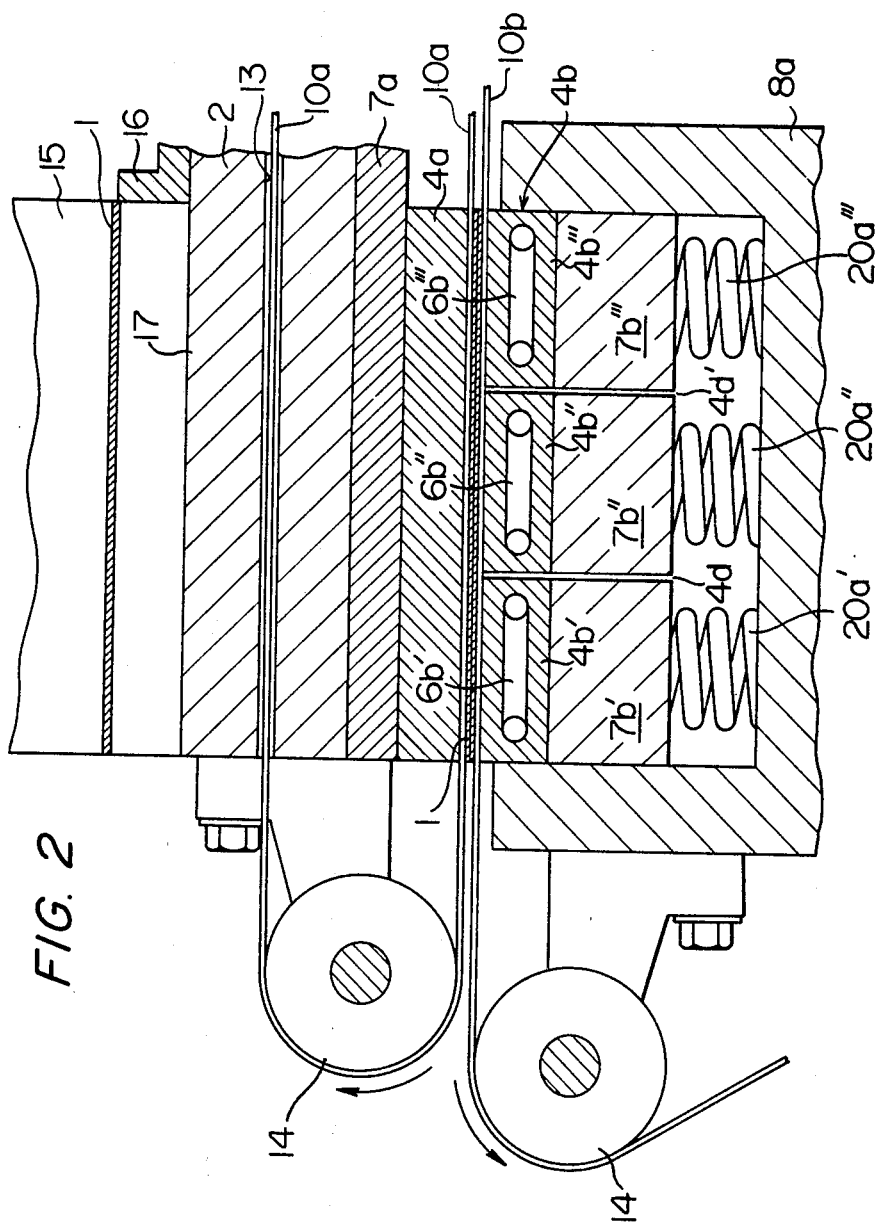
FIG. 2 is a longitudinal sectional view taken along line II—II of FIG. 1.
Figure 3:
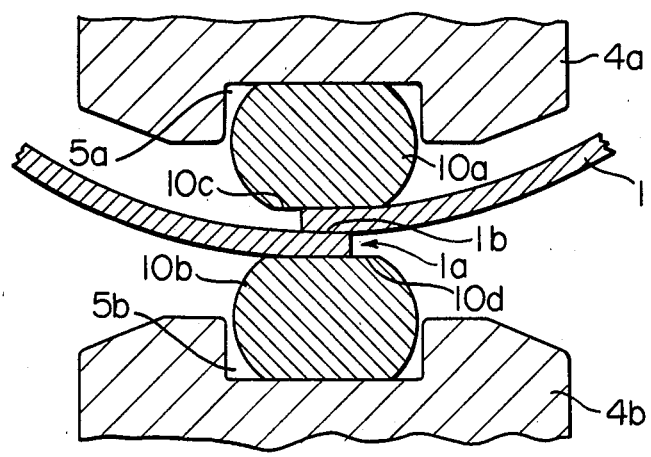
FIG. 3 is a partly enlarged sectional view of the neighborhood of the lapped portion shown in FIG. 1.

A can body-like structure 1 rounded by a can body maker (not shown) rides over a mandrel 2 and is conveyed by a ratchet 16 from the right in FIG. 2. It stops at a welding station, and simultaneously, is brought into intimate contact with the mandrel by press wings 9. In the welding station, a pair of parallel electrodes 4a and 4b are disposed parallel to the axial direction of the mandrel 2. The opposing surfaces of the upper electrode 4a and the lower electrode 4b are parallel to each other. On these opposing surfaces are provided guide grooves 5a and 5b parallel to each other in the axial direction of the mandrel 2 and having a ]-shaped cross section. In the interior of the parallel electrodes, cooling holes 6a and 6b extend in close proximity to the guide grooves 5a and 5b. Cold water or cooling brine (for example, at −30° C.) circulates through the cooling holes to cool the parallel electrodes and the wire electrodes and thus to prevent a temperature rise of the wire electrodes 10a and 10b at the time of welding. The effect of cooling the wire electrodes is increased by optionally blowing cooling air from outside. The upper and lower parallel electrodes are connected to a welding electric power source (22 in FIG. 4) through conductors 7a and 7b provided in contact with the outside surfaces of these electrodes. The upper parallel electrode 4a is embedded in the lower portion of the mandrel 2, and the lower parallel electrode 4b is fixed to the upper end of the conductor 7b.

Desirably, the parallel electrodes are composed of copper or a copper alloy.

A pair of wire electrodes 10a and 10b are fitted slidably in the grooves 5a and 5b respectively and project out of the grooves. Each of the wire electrodes 10a and 10b is supplied from a delivery reel (shown at 29 in FIG. 4) provided on the right hand side of FIG. 2 and advances in one direction in each of the grooves 5a and 5b as the welding cycles take place. Finally, these wire electrodes are wound up by windup reels (shown at 28 in FIG. 4). The upper wire electrode 10a is turned in a direction opposite to the advancing direction of the can body by means of an idler 14 secured to the front end of the mandrel 2, and after passing through a guide hole 13 extending through the mandrel, it is wound up. It is important that at least the opposing surface 10c and 10d of the wire electrodes 10a and 10b should be parallel to the axial line of the mandrel 2.

By direct contact with the wire electrodes, a lapped portion 1a of the can body-like structure 1 is pressed and an electric current is passed therethrough. If the pressing force is not uniform (especially in the lengthwise direction), electric resistance at a surface 1b of contact between the marginal portions of the blank at lapped portion 1a becomes non-uniform in the longitudinal direction of the lapped portion. Consequently, an excessively large current flows in parts having a low electric resistance. This results in localized fusion, and is likely to cause splashes.

Figure 4:
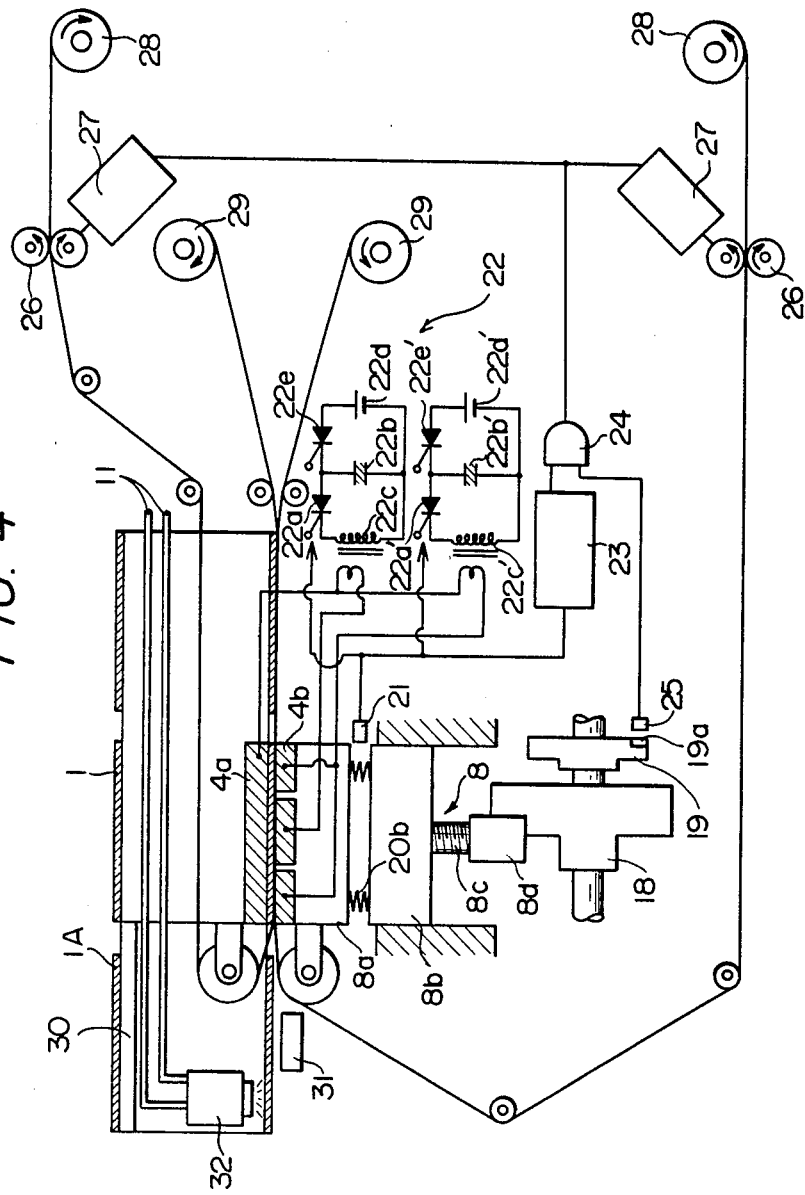
FIG. 4 is a schematic view showing a system for producing a welded metallic can body in accordance with this invention.

According to the present invention, in order to prevent the aforesaid non-uniform electric current and therefore localized overheating, the lower parallel electrode 4b is divided into a multiplicity of portions in the direction of its length, for example a central portion 4b" and end portions 4b' and 4b'", as shown in FIGS. 2 and 4, and these portions are insulated from each other by electrical insulating materials in spaces 4d and 4d'. Furthermore, as shown in FIG. 2, the conductor 7b contacting the lower parallel electrode is divided into a central portion 7b" and two end portions 7b' and 7b'" which are electrically insulated by electrical insulating materials 4d and 4d'. As shown in FIG. 4, the central portion 4b" and the two end portions 4b' and 4b'" of the lower parallel electrode 4b are connected to welding transformers 22c and 22c' through the central portion 7b" and the end portions 7b' and 7b'" of the conductor 7b. Thus, the electric power supplied is regulated for each power source so that the heat of electric resistance is generated uniformly in the central portion and the two end portions.

This power regulation is performed by measuring welding currents flowing in the secondary sides of the two welding transformers 22c and 22c' using a Rogowski coil, determining charging voltages of condensers 22b and 22b' so that the current densities are equal at the weld zone. In order to preset the charging voltages accurately, welding is actually conducted, and the presetting of the charging voltages is finely adjusted so that the entire area will be welded uniformly.

The parallel electrodes 4b' and 4b''' (FIG. 2) are preferably connected in parallel at the ends thereof, and connected to the welding transformer 22c' (FIG. 4). As a result, the non-uniform welding of both end portions which is due to the variations in the blank stopping position at the weld zone can be prevented.

The wire electrodes 10a and 10b are made by rolling a round copper wire. Variations in the thickness or hardness of the rolled copper wires occur depending upon variations in the hardness of the round wires, the accuracy of the rolling mill. Thus, variations in pressure occur when the weld zone is pressed by these rolled wires. Furthermore, when the wire electrodes are used for a long period of time, the plate electrodes 4a and 4b undergo wear, and the pressure applied to the weld zone becomes non-uniform.

Figure 1:
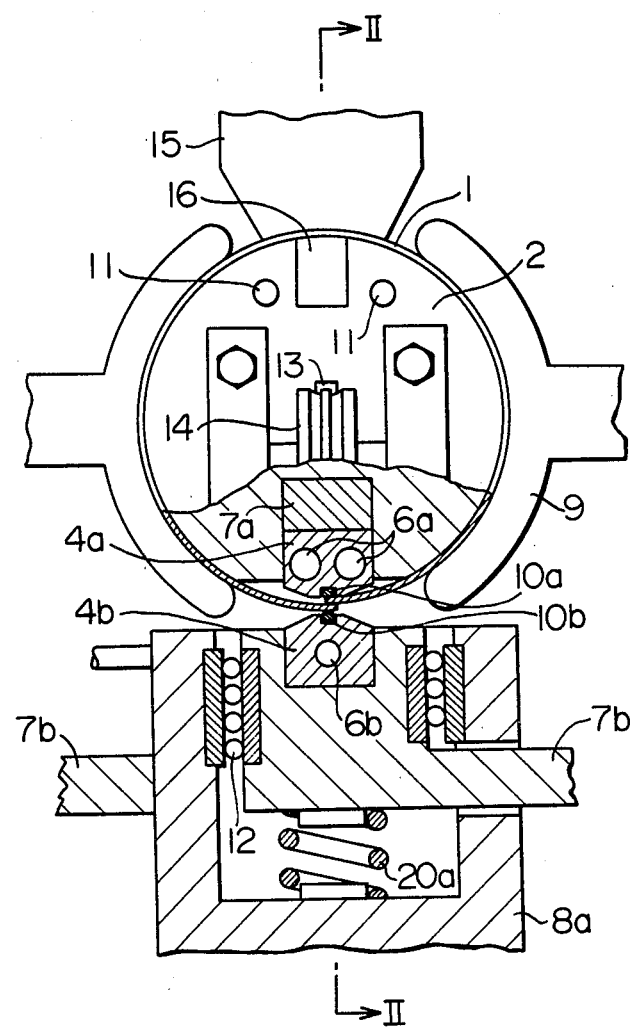
FIG. 1 is a front elevation, partly broken away, of one embodiment of the apparatus for producing a welded metallic can body in accordance with this invention.

The non-uniformity in pressure can be removed or reduced by making the lower parallel electrode in several parts which are independently slidable, and connecting each of these portions independently to the press means 8 via a cushioning mechanism comprising a spring or a hydraulic or pneumatic pressure means so that the individual portions exert a pressing force on the mandrel independently from each other. This removal of pressure non-uniformity can contribute to unifrom generation of the heat of electric resistance. Specifically, as shown in FIGS. 1 and 2, the lower parallel electrode 4b and the conductor 7b are each separated into three portions in the direction of the length thereof with each portion separately slidable toward and away from the electrode 4a, and respective cushioning mechanisms (e.g., springs) 20a', 20a'' and 20a''' are provided so as to urge the separate portions 7b', 7b'' and 7b''' of the conductor 7b and the corresponding separate portions 4b, 4b'' and 4b ''' of the electrode 4b respectively and independently toward the axis of the mandrel 2. Bearings 12 are provided to reduce friction between the conductor 7b and the upper press member 8a and reduce wear.

The mandrel 2 includes supply pipes 11 (FIG. 4) for supplying paint and air in order to form a protective coating on the inside surface of the welded part of a metallic can body. Since the mandrel 2 is supported only at one end, a mandrel support 15 for preventing its upward flexing in the event of pressing by the press means 8 is provided above the mandrel 2 which corresponds to the space between the two side press wings 9. Normally, the mandrel support 15 is situated above the mandrel 2 and the can body-like structure 1, but when the press means 8 acts on the lapped portion 1a, it descends and presses on the mandrel 2 via the can body-like structure 1. When the welded can body-like structure is to be delivered, it again rises.

The system of producing a welded metallic can body in accordance with this invention is described with reference to FIG. 4.

The press means 8 reciprocates vertically by a drive mechanism 18 driven by a motor. A cam mechanism, a crank mechanism, a cylinder mechanism, etc. can be employed as the drive mechanism 18. In FIG. 4, the drive mechanism 18 is a cam mechanism. In order to apply a predetermined magnitude of pressure and to make it easy to provide pressure during the prescribed pressing time, a cushioning means 20b (which may be a spring, hydraulic pressure means, pneumatic pressure means, etc.) is provided between the upper member 8a of the press means (the portion having the lower parallel electrode 4b and the conductor) and the slide portion 8b of the presser. A screw 8c is provided between the slide portion 8b of the press means and a cam follower 8d so as to adjust the height of the slide portion 8b. This adjustment of height enables the pressing force and the pressing time to be regulated within certain fixed ranges.

The cam mechanism 18 and the ratchet 16 (FIG. 2) are synchronized so that as soon as the can body-like structure 1 comes to a stop at the welding station, pressing of the lapped portion starts. Desirably, an electric current should be passed after a predetermined pressing force has been reached. When a current is passed while the pressing force is still insufficient, the pressure on the lapped portion becomes non-uniform. This may cause localized overheating and subsequent formation of splashes. For this purpose, a switch 21 which is closed when the press means 8 rises to a position at which it imparts a predetermined pressing force is provided adjacent the slide portion 8b. Thus, as soon as the switch 21 is closed, the parallel electrodes 4a and 4b are energized through a welding power source circuit 22. There is no particular restriction on the type of the welding power source circuit 22. When the time of passage of the an electric current is less than about 20 milliseconds, it is preferred to use a commercial frequency power source equipped with a timer. When the time of the current is shorter than about 40 milliseconds, an electromagnetic inductance type or electrostatic condenser type power source may be conveniently used. FIG. 4 schematically shows an electrostatic condenser type power source.

When the switch 21 is closed, thyristors 22a and 22a' are triggered, and thereby condensers 22b and 22b' discharge to energize the lower parallel electrodes 4a and 4b through the transformers 22c and 22c'. Upon completion of discharging, thyristors 22e and 22e' are triggered and the condensers 22b and 22b' are charged through direct-current power sources 22d and 22d'.

Synchronism of the cam mechanism 18 is provided so that the lower parallel electrode 4b begins to descend immediately after the completion of welding. It is undesirable to release the pressure during the passing of an electric current because sparks are generated in and are likely to cause a burning loss in the weld zone. Synchronously with the descending of the electrode 4b, the press wings 9 are opened, and the ratchet 16 slides over a ratchet guide 17 and moves to the left from the right hand position in FIG. 2 to deliver the welded can body-like structure 1 from the welding station, namely from between the wire electrodes. Subsequently, the next can body-like structure 1 is fed into the welding station, and welding is performed in the same manner as above.

The wire electrodes, as stated hereinabove, are usually produced by lightly rolling a round wire flat. Slightly raised and depressed areas may be formed at this time on the flat surface. These areas, however, disappear after several cycles of welding. As the number of welding cycles further increases, the wire electrodes conform to the profile of the lapped portion, and a proper pressing force is exerted on the entire area of the lapped portion. Under normal conditions, the same portions of the wire electrodes 10a and 10b can be repeatedly used in welding until they are greatly deformed and a uniform pressing force is difficult to obtain after several tens of welding cycles. Accordingly, the wire electrodes may be moved in the same direction a length corresponding to the length of a can body after every several tens of welding cycles. Or they may be moved in the same direction little by little after one or several welding cycles. The used wire electrodes are repaired for reuse. When they cannot be repaired, they are melted and new wire electrodes are formed.

To achieve high-speed continuous production of cans, it is desirable to perform the movement of the wire electrodes after the releasing of the pressing by the press means 8 and before the next pressing is started. An embodiment for such a production process is described with reference to FIG. 4.

Every time the switch 21 is closed by the rising of the press means 8, a signal is supplied to a preset counter 23. The present counter 23 is constructed such that when a signal of a preset count value is put thereinto, it produces an ON signal until the next signal comes in, and then the counter 23 again begins counting from 1. The output of the preset counter 23 is supplied to an AND circuit 24. On the other hand, a switch 25 is provided adjacent a rotating plate 19 secured to the rotating shaft of the cam mechanism 18. The rotating plate 19 is composed mainly of a non-magnetic material. However, in order to close a switch 25 only for a preset time t when the pressing of the lapped portion by the press means 8 is released, a magnetic material 19a is disposed in the rotating plate 19 on the surface facing the switch 25. This preset time t is the time required for the movement of the wire electrodes, and is determined by a preset length of one movement of the wire electrodes and the peripheral speed of a pair of pinch rolls 26 which are the drive means for the wire electrodes. The output of the switch 25 is supplied to the AND circuit 24. The output of the AND circuit 24 is connected to a clutch brake circuit 27 constituting a drive mechanism for the pinch rolls 26, so that when the output of the AND circuit 24 is on, the clutch is set in motion, and when it is off, the brake comes into action. Accordingly, the pinch rolls 26 rotate only during the preset time t to deliver the wire electrodes in the direction of the windup reels 28. Since the windup reels 28 are driven by a torque motor, they take up the wire electrodes only during the rotation of the pinch rolls 26.

Now, welding conditions are described with reference to a metal blank composed of a low carbon steel substrate and having a thickness of 0.14 to 0.35 mm.

The width of the lapped portion 1a of such a metal blank is preferably about 0.1 to about 1.0 mm. As the thickness of the blank increases, the width of the lapped portion increases within the above range. If the width of the lapped portion is smaller than about 0.1 mm, it is difficult to overlap the marginal portions of the blank uniformly in the longitudinal direction. Furthermore, the lapped portion tends to slip in the pressed state, and the weld strength of this portion decreases. On the other hand, a width of more than about 1.0 mm is unnecessary from the viewpoint of welding strength. This brings about the disadvantage that the required amount of current or pressing force increases, and the equipment must be increased excessively in size.

From the width of the lapped portion and the diameter of the mandrel at the welding station, the size of the metal blank in the advancing direction of the mandrel and in a direction perpendicular thereto are determined. The lapped portion 1a is formed by pressing the periphery of the can body-like structure 1 against the mandrel by the press wings 9 which are provided exteriorly of the mandrel in the welding station and have an inside surface configuration corresponding to the outside diameter of the mandrel.

The pressure to be applied to the lapped portion during welding (i.e., pressing load by the presser 8 per unit area of the lapped portion) is about 15 to about 60 kg/mm$^2$, preferably 25 to 45 kg/mm$^2$. If the pressure is less than 15 kg/mm$^2$, the resistance of contact between the steel sheets at the lapped portion becomes non-uniform, and an excessively large current may flow locally. As a result, localized overheating occurs to cause splashing or to form a black oxide film, and the stability of the welded part is lost. Furthermore, since sufficient engagement cannot be performed under such a lower pressure, the end portion of the blank may remain after the welding, to cause formation of a step in the welded part.

On the other hand, if the pressure is higher than 60 kg/mm$^2$, considerable deformation (depression) of the wire electrodes occurs, and the amount of movement of the wire electrodes must be increased.

Desirably, the time during which an electric current is passed is about 3 to about 80 milliseconds, preferably 5 to 30 milliseconds. If the time is shorter than 3 milliseconds, a large welding current is required in order to obtain a sufficient welding strength. In this case, a large electric current must be supplied within a very short period of time. Hence, only the interfacial part of the steel plate is locally melted and splashing is liable to occur. On the other hand, if the time is longer than 80 milliseconds, the heat is transmitted to the neighboring part of the lapped portion of the can body-like structure to cause marked formation of a black oxide film. Since the heat is also dissipated to the wire electrodes, the current efficiency decreases and damage of the wire electrodes is heavy. The optimum time during which to pass an electric current is determined depending upon the thickness of the metal blank, the width of the lapped portion, the pressing force, the voltage of the power source, the wave form of the electric current, etc. The time must be increased as the width of the lapped portion increases.

When it is required to cover the inside surface of the welded part with a protective coating, the welded can body 1A is conveyed leftward along a guide 30 extending from the front end of the mandrel 2, and if required, re-heated to about 50° to about 300° C. by a preheating device 31 (e.g., a high-frequency heating coil or a burner) in order to increase wetting of the paint. Then, a protective paint is sprayed onto the inside surface of the welded part from a spray nozzle 32 (for example, an airless gas; in this case, the gas controls the spray pattern) provided at the front end of the paint supplying pipe 11. Then, the protective paint is fused or heat-cured by a drying-baking oven, a burner, a high-frequency heating device, etc. to form a non-porous firm coated film on the inside surface of the welded part and its surrounding part.

Depending upon the use, the protective paint may be a powder paint composition, a dispersed paint, an aqueous or solvent-type slurry paint, a solvent-base paint, etc. which is derived from at least one of polyesters, modified polyolefins, epoxy resins, acrylic resins, polyvinyl chloride, polyamides, vinyl acetate resin, polyvinyl acetal, polyethers, polycarbonates, epoxy esters, phenolic resins, amino resins, alkyd resins, polyurethane resins, silicone resins, etc.

Besides spray coating, roll coating and other coating methods may be employed to form a protective paint film.

To the welded metallic can body produced in the above manner is secured a bottom closure usually by a double seaming method. Foods and drinks such as carbonated beverages, non-carbonated drinks, fruit juices and fish and shell fish and non-food items such as aerosols may be filled in such a can, and then sealed up.

The following Example illustrates the effects of this invention more specifically.

Example (a) A blank having a size of 165.7 mm × 101.3 mm was cut from a steel plate electroplated with tin (thickness 0.23 mm; the amount of tin plated 25 lb/B.B; thickness of the tin layer about 0.6 $\mu$m) which had been margin-coated with an epoxy-phenol type paint at that part which was to become the inside seam portion of a can and also margin-coated and printed at that part which was to become the outside surface of the can.

The blank was formed into a cylindrical shape by a roll former so that its shorter side was located in the axial direction of the cylindrical shape. The resulting structure was fed to a mandrel in a welding station so that its lapped portion was located centrally between wire electrodes. It was set therein with the width of the lapped portion adjusted to 0.4 mm. Then, a pressure (welding pressure 26 kg/mm$^2$) was applied to the lapped portion of the can body-like structure by parallel electrodes through the wire electrodes. Then, a current was passes across the electrodes for 25 milliseconds.

The upper parallel electrode had a length of 112 mm. The lower parallel electrode was divided into three portions, a central portion 4$b''$ having a length of 50 mm, and two end portions 4$b'$ and 4$b'''$ each having a length of 28 mm. The end portions were connected in parallel to each other and to one welding transformer 22$c'$, and the central portion was connected to another welding transformer 22$c$. These three electrode portions were insulated from each other by a Bakelite plate having a thickness of 0.2 mm. These welding transformers were connected respectively to condensers 22$b$ and 22$b'$ having nearly the same capacitance (condenser capacitance 40,000$\mu$F).

Grooves 5$a$ and 5$b$ provided in the parallel electrodes were rectangular in cross section and had a depth of 0.6 mm and a width of 2.2 mm. The wire electrodes used were produced by rolling a mild copper wire having a diameter of 1.5 mm (JIS 3102, conductivity more than 100%) to a width of 2.0 mm.

A cam mechanism was used to apply pressure to the lapped portion in order to avoid shock on the lapped portion.

The parallel electrodes were cooled with brine at $-30°$ C. Cans were produced continuously at a welding speed of 450 cans/min. The wire electrodes were moved intermittently, and for each welding cycle, the electrodes were moved a distance of 10 mm. The surface of the welded part of the resulting can body had a metallic luster and was flat and beautiful with no heat deformation nor formation of splashes or projections at the front and rear ends of the welded part.

(b-1) Charging voltages of the two condensers 22$b$ and 22$b'$ were determined so that the entire area of the weld zone was uniformly welded. The charging voltages were varied at the same rate, and the voltage $V_1$ at which complete joining of the weld zone began (the voltage at which parts other than the weld zone underwent fracture when the weld zone was subjected to a tensile test) and the voltage $V_2$ at which splashes formed were determined. It was found that the charging voltages of the two condensers 22$b$ and 23$b'$ were almost the same, and $V_1$ was 360 V and $V_2$ was 410 V.

(b-2) When the condensers 22$b$ and 22$b'$ were connected in parallel respectively to the welding transformers 22$a$ and 22$a'$ and welding was performed without dividing the lower parallel electrode, the charging voltages of the condensers were $V_1 = 370$ V and $V_2 = 400$ V.

It is seen from the above results that when divided electrodes are used in accordance with this invention the generation of heat at the weld zone becomes uniform and the range of the charging voltages of the condensers which permit good welding is broad, as compared with the case of not dividing the electrodes.

(c-1) An epoxy-phenol paint was spray-coated on the welded part of the outside surface of the can body produced in the manner described in section (a) above so that the dried coated film had a width of 7 mm and a thickness of 40 to 60 microns. Then, the coated film was baked for 4 minutes in a hot air drying oven at 220° C.

The can body was then flanged, and an easy-to-open closure whose inside surface had been coated with a vinyl chloride resin type paint was secured to it by a double seaming method. Apple juice was filled into the can at 90° C., and a tin-plate closure whose inside surface had been coated with an epoxy-phenol type paint was secured to the can by a double seaming method. The canned juice was then stored for 6 months at 50° C.

Using ten samples of the resulting can bodies, the amount of protrusion of iron from the lap side seam portion was examined, and found to be 0.020 mm.

After storing for 6 months at 50° C., the cans (100 samples) were opened, and the amount of iron dissolved in the apple juice was examined. It was 0.50 ppm.

(c-2) Welded can bodies were produced in the same way as described in section (a) above except that undivided parallel electrodes were used. Cans were produced, filled with an apple juice, and tested in the same way as described in section (c-1).

It was found that the amount of iron protruding from the lap side seam portion of the can bodies was 0.025 mm, and the amount of iron dissolved in the can contents was 0.75 ppm.

What we claim is:

1. A method for producing a welded metallic can body from a metal blank bent into a cylindrical can-like structure with marginal side edges overlapped, comprising: holding the overlapped edges of the can-like structure along the entire length of the structure between a pair of opposed parallel wire electrodes positioned on the opposed surfaces of parallel electrodes, one of said parallel electrodes being divided into a plurality of portions side-by-side along the wire electrodes and electrically insulated from each other and individually movable toward and away from the opposed parallel electrode; simultaneously passing electric currents electrically in parallel across said portions and the other electrode for a predetermined period of time while exerting pressure on the individual electrode portions independent of the pressure exerted on the other portions for pressing the wire electrodes against the overlapped edges for subjecting the overlapped edges to substantially uniform pressure along the entire length of said parallel electrodes resistance welding, and supplying the electric currents through at least one of said portions from an electric current source independent from the electric current source for the current through the other portions and the respective currents having current level values for causing the temperature rise in the overlapped edges of the can body-like structure to be uniform along the length of the overlapped edges.

2. A method as claimed in claim 1 wherein said one of said parallel electrodes is divided into a central portion and two end portions, and the same current is passed through said two end portions and a current independent of the current through the two end portions is passed through said central portion.

3. A method as claimed in claim 1 wherein the metal blank comprises a low carbon steel plate as a substrate.

4. A method as claimed in claim 1 wherein the metal blank has a thickness of about 0.15 to about 0.35 mm.

5. A method as claimed in claim 1 wherein the overlapped portion has a width of about 0.1 to about 1.0 mm.

6. A method as claimed in claim 1 wherein the pressure is from about 15 to about 60 kg/mm$^2$.

7. A method as claimed in claim 1 wherein the electric current is passed for a period of about 3 to 80 milliseconds.

8. A method as claimed in claim 1 further comprising blowing cooling gas against the wire electrodes at the overlapped portion.

9. A method as claimed in claim 1 further comprising cooling said parallel electrodes with a cooling medium.

10. An apparatus for producing a welded metallic can body from a metal blank bent into a cylindrical can-like structure with a marginal side edges overlapped, comprising: a pair of opposed parallel elongated electrodes, one of said parallel electrodes being divided into a plurality of portions positioned side-by-side in the direction of the length of said electrodes and electrically insulated from each other and individually movable toward and away from the opposed electrode; a pair of opposed parallel wire electrodes positioned on the opposed surfaces of said parallel electrodes for holding the overlapped edges of the can-like structure therebetween along the entire length of the structure; means connected to the respective electrode portions for providing currents from at least two separate sources of electric current and for passing electric currents electrically in parallel across said portions and the other electrode for a predetermined period of time and with the current through at least one of said portions being from one of said sources and being independent from the currents through the other portions and the currents having current values for causing the temperature rise in the overlapped edges of the can body-like structure to be uniform along the length of the overlapped edges; and means for exerting pressure on the respective electrode portions independently of the other electrode portions for pressing the wire electrodes and parallel electrodes against said overlapped edges with substantially uniform pressure along the entire length of said parallel electrodes.

11. An apparatus as claimed in claim 10 wherein one of said parallel electrodes consists of a central portion and two end portions, said two end portions being electrically connected in parallel to a single current input circuit and the central portion being connected to another current input circuit.

12. An apparatus as claimed in claim 10 or 11 wherein a separate pressure applying means is provided for each of said portions of said one electrode.

13. An apparatus as claimed in claim 10 wherein said parallel electrodes each have at least one hole therethrough, and said apparatus further comprises means for flowing a cooling medium through said holes.

14. An apparatus as claimed in claim 10 wherein said apparatus further comprises a mandrel on which one of said parallel electrodes is mounted, the other of said electrodes being mounted on said pressure exerting means.

15. An apparatus as claimed in claim 10 wherein the opposed surfaces of said parallel elctrodes each have a rectangular cross-section recess therealong in which said wire electrodes are positioned.

16. An apparatus as claimed in claim 10 wherein the opposed surfaces of said parallel electrodes each have an L-shaped cross-section recess therealong in which said wire electrodes are positioned.

17. An apparatus as claimed in claim 10 wherein the surface of each wire electrode which contacts the parallel electrode is flat and the surface of the wire electrode which contacts the overlapped portions is flat, said flat surfaces being parallel.

18. An apparatus as claimed in claim 10 wherein the wire electrodes have a Vicker's hardness of from about 70 to about 180.

19. An apparatus as claimed in claim 10 further comprising an air supply pipe and a pipe for supplying a paint to the inside of the welded part of the welded metal can body for forming a protective paint film thereon.

* * * * *